March 31, 1953  E. A. BLACK  2,633,054
IMAGE RECORDING DEVICE
Filed Jan. 30, 1947  3 Sheets-Sheet 1
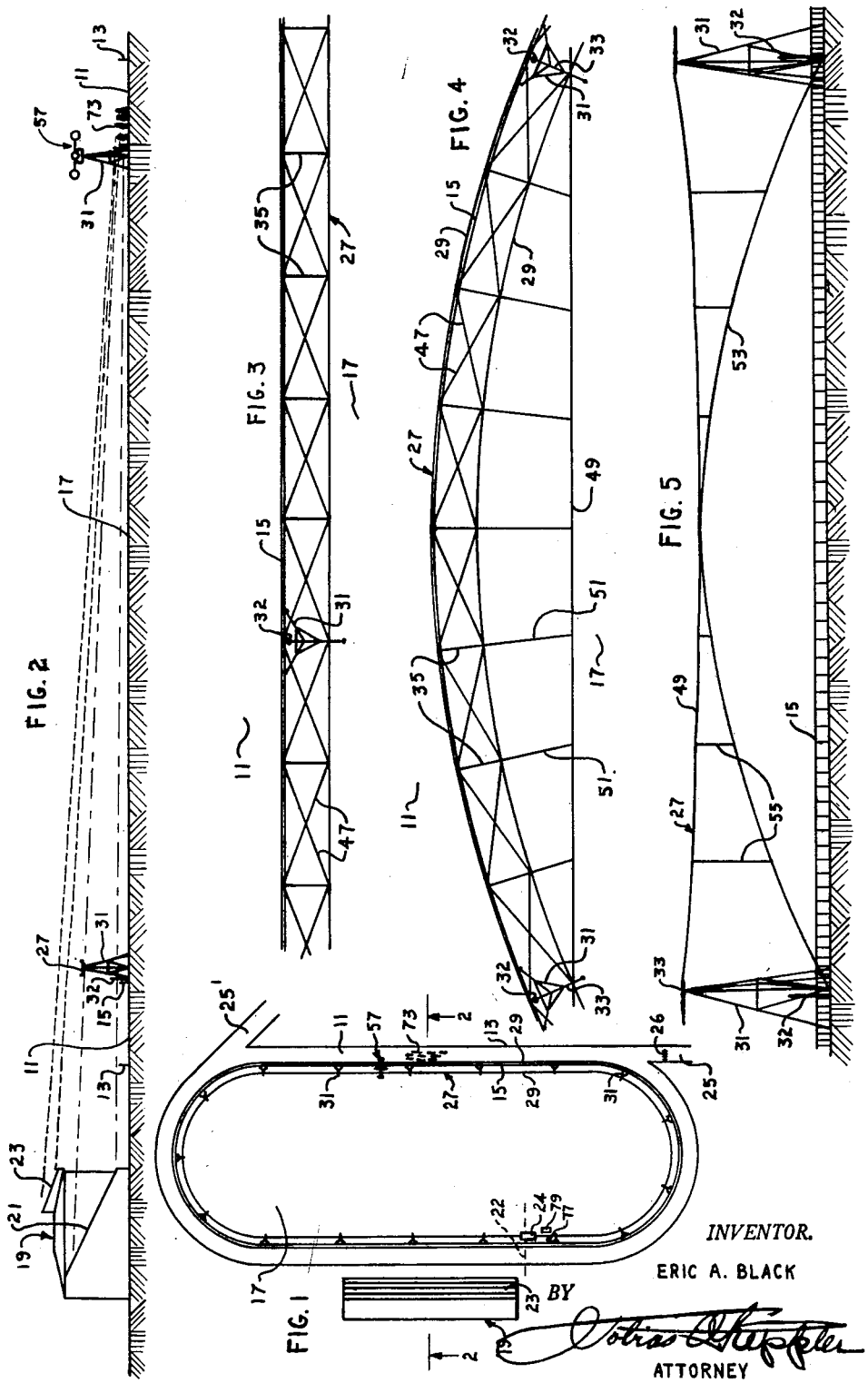
INVENTOR.
ERIC A. BLACK
BY
ATTORNEY March 31, 1953 E. A. BLACK 2,633,054
IMAGE RECORDING DEVICE
Filed Jan. 30, 1947 3 Sheets-Sheet 2
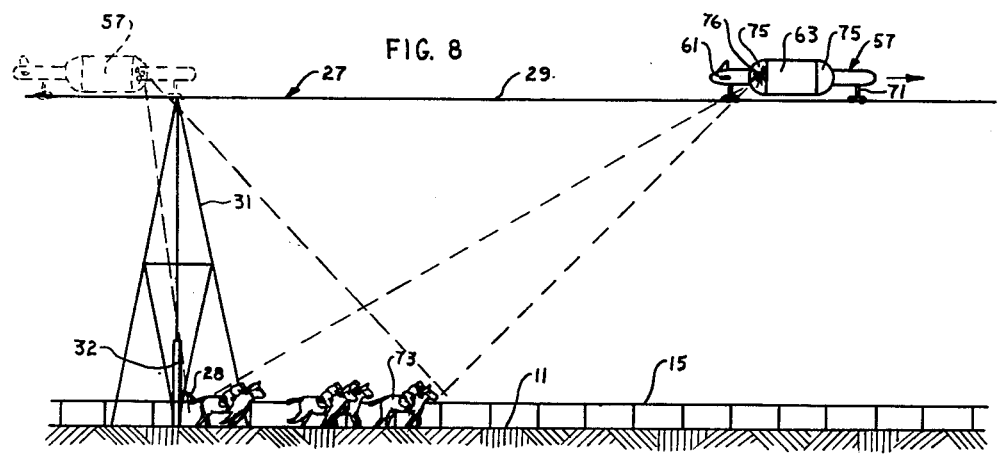
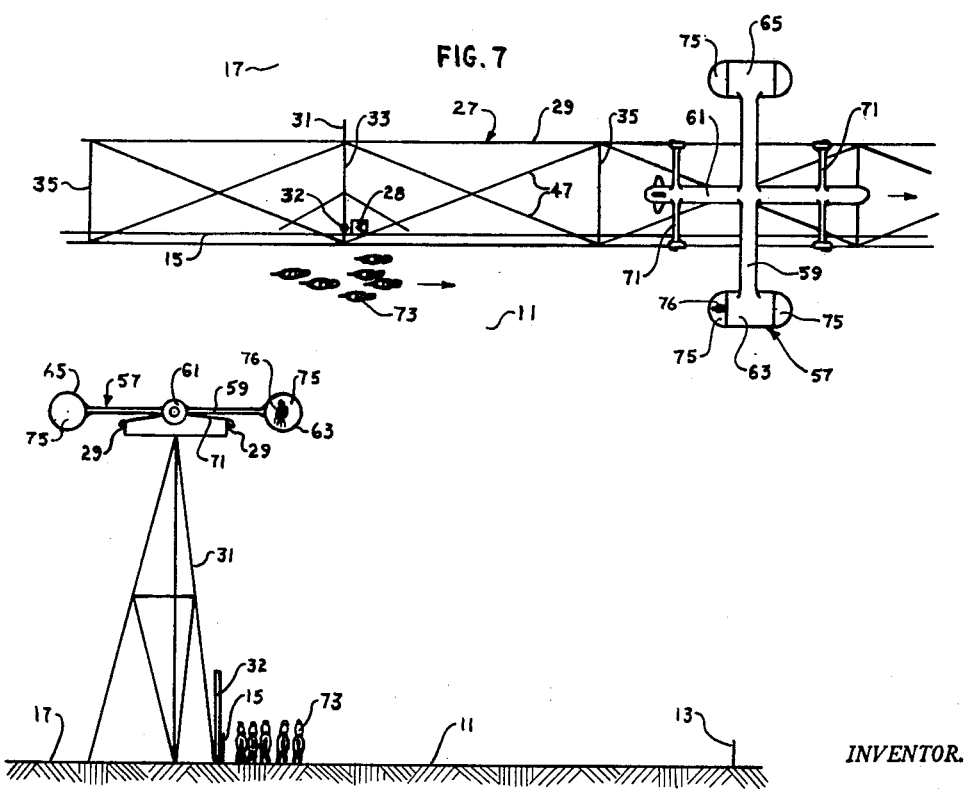
INVENTOR.
ERIC A. BLACK
BY
ATTORNEY March 31, 1953     E. A. BLACK     2,633,054
IMAGE RECORDING DEVICE
Filed Jan. 30, 1947     3 Sheets-Sheet 3
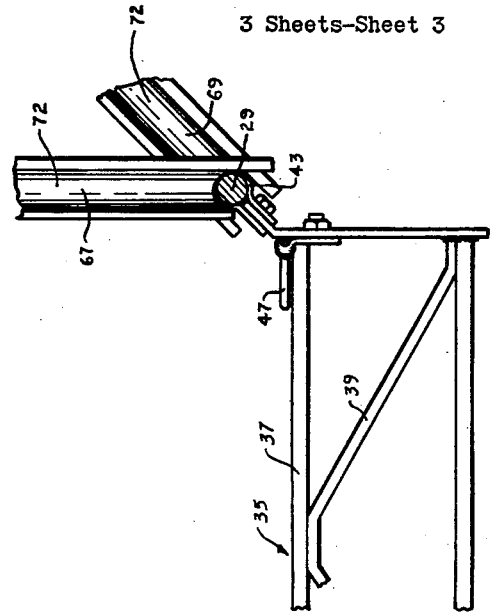
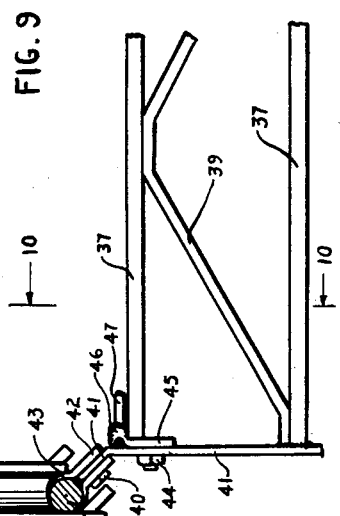
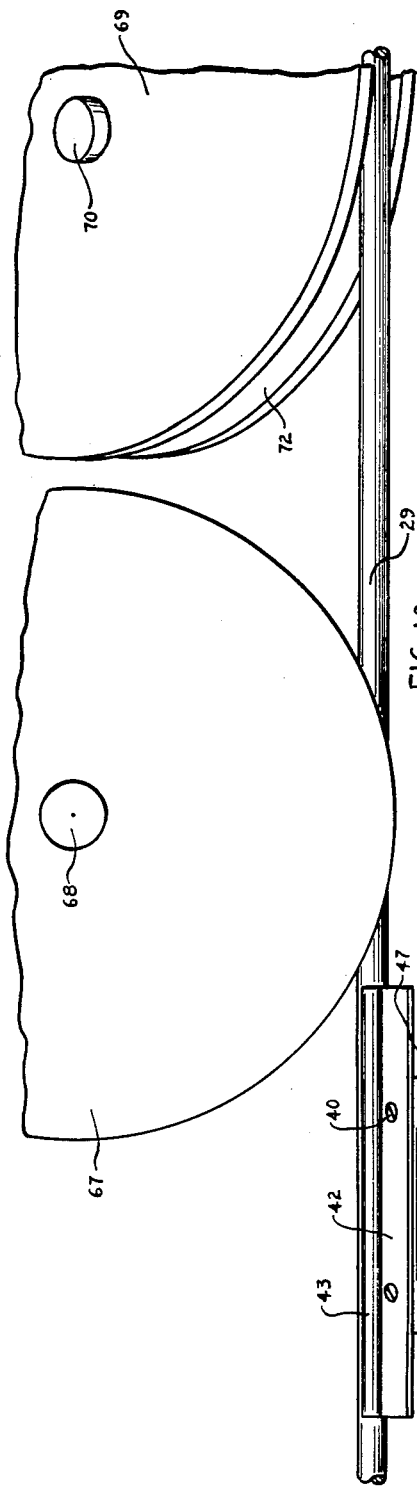
INVENTOR.
ERIC A. BLACK
BY
ATTORNEY Patented Mar. 31, 1953

2,633,054

UNITED STATES PATENT OFFICE 2,633,054

IMAGE RECORDING DEVICE

Eric A. Black, Red Bank, N. J., assignor to Sport Movies, Inc., a corporation of New York Application January 30, 1947, Serial No. 725,290

9 Claims. (Cl. 88—16)

Although the apparatus described in the present application is primarily intended for taking motion pictures of, or for televising, a horse race, it will be understood that the apparatus and system may be applicable to other uses.

In taking motion pictures of horse races in the past, the usual procedure was to station one or more cameramen at one or perhaps several strategic locations about the race track so as to take photographs of the moving horses, at various angles, from said locations. The results have not been satisfactory because, among other things, it was impractical in most cases to suitably photograph each race in its entirety because of the large number of cameras and cameramen which would be needed; the results were poor because the horses in considerable portions of the films were at substantial distances from the camera so as not to be entirely clear and, where telephoto lenses were used to enlarge the images, the distortions introduced resulted in poor photography; the motion pictures obtained were displeasing and disconcerting to an audience as the horses would swing in from the left (when they would be of small size relative to the screen), would then approach the camera (continually increasing in size), would then whiz by the camera (at which time the background would be blurred because of the speed at which the camera was being "panned"), and they would then move off to the right (when they would again rapidly diminish in size).

Such poor results are particularly notable in films taken with a number of cameras by a number of cameramen, stationed about the track, who photograph the horses as they approach and go by. It is then necessary for one or two other employees to make a complete circuit of the track after the horses go by, to gather up the several reels of film taken by the several cameras and transport them to a processing laboratory where they may be processed and spliced into a single reel so that the pictures of the race may be viewed by the judges or others.

Although an extremely important purpose of taking motion pictures of a horse race is to discover fouls which may be practiced by the jockeys, it is readily apparent that systems of taking motion pictures, such as just described, are not satisfactory, primarily because the angle at which the horses are viewed by the cameras is constantly changing (the cameramen being stationary and to one side or the other of the track) and much of the time the spaces between the horses, which is where fouls usually take place, are not visible to the camera at all. Under such systems of photography, a large percentage of the pictures are taken from one side or the other of the horses, so that fouls occurring on the side of the horses away from the camera are completely hidden from the camera's view. Even when the horses are running directly toward the camera (which condition may obtain during some parts of each race), the distances between the horses and the camera are so great as to make for distortion and indistinctness. The result is that, although a large number of cameras and cameramen are employed and a large number of separate reels of film are exposed, fouls are rarely if ever discerned.

It is thus seen that, in order to photograph fouls which may occur, it is necessary to clearly view the spaces between the horses throughout the entirety of a race. It is also seen that for a better quality of picture, which would be more satisfactory for use in newsreels and the like, the size of the horses relative to the screen and the direction from which they are being viewed should remain substantially constant.

Therefore it is an object of the present invention to provide means for taking motion or still pictures of, for televising, etc., a horse race or the like in which each of one or more cameras is able to view the horses from a substantially constant distance and from one of several possible positions, relative to the horses, from which the spaces between the horses are distinctly visible to the camera throughout the race.

Still other objects are to allow continuous motion pictures of a horse race or the like to be taken with a minimum of equipment and personnel and so that motion pictures of the event may be projected within a minimum of time after the event; to provide a system for recording images of a horse race or the like which does not interfere with the visibility of the event by the spectators; and to provide such a system wherein the pictures of any particular part of a race may be readily singled out in order to look for fouls which may be charged, etc.

Other objects and advantages will become apparent from the following description of a preferred embodiment of the present invention.

I accomplish the foregoing objects by means of an aerial cableway disposed above a race track and following its contours. This aerial cableway is so designed that it may be sustained by supports which are considerable distances apart, but nevertheless the cableway may incorporate curves similar to those of the race track.

I further provide a car which is adapted to ride on said cableway at high or low speeds, as required, and which may safely negotiate the curves aforesaid. The said car is provided with a cab to accommodate a cameraman, which cab preferably extends outwardly from one side of the car so that photographs of the horses may be taken, from above them, in a generally downward direction, without any interference from the cableway or its supports.

Thus, in taking photographs of a horse race, the car is preferably operated on the cableway at the same speed as the horses, but a suitable distance in front of them, so that the camera may be directed downwardly and backwardly so as to take pictures of the horses from ahead of and from above them, and so that the spaces between the horses may be clearly seen in the finished pictures. If desired, the car may be kept a short distance behind, rather than ahead of, the horses. The horses, the jockeys and the spaces between the horses may be photographed clearly in either way. From either position, an entire horse race may be photographed on a single reel of film which may be rapidly processed at the end of the race (or even while the race is being photographed) so that it may be viewed almost immediately after the race. If desired, two or more cars may be used so as to take pictures simultaneously from several different positions.

In the accompanying drawing, which shows a preferred embodiment of the present invention:

Figure 1 is a plan view, taken during the running of a race, of a typical horse race track provided with an aerial cableway following the contours of the track;

Figure 2 is a vertical sectional view, taken along the line 2—2 of Figure 1;

Figure 3 is an enlarged plan view of a straight portion of the aerial cableway of Figure 1;

Figure 4 is a similar view of a curved portion of said cableway;

Figure 5 is an elevational view of the curved portion shown in Figure 4;

Figure 6 is a further enlarged fragmentary elevational view showing the right hand portion of Figure 2 with the car in position upon the cableway;

Figure 7 is a plan view of Figure 6, the arrow indicating the direction in which the horses and car are moving;

Figure 8 is a side elevational view taken from the right of Figure 6, an arrow again showing the direction of movement and a second car (or the one car in an alternative position) being shown in broken lines, and the fields of view of the cameras also being indicated by broken lines;

Figure 9 is a more enlarged fragmentary elevational view, similar to Figure 6, showing details of the cableway and the car wheels; and Figure 10 is a fragmentary vertical sectional view, taken along the line 10—10 of Figure 9.

Referring now to the drawing (particularly Figures 1 and 2), there is shown a typical race track 11, of elongated oval configuration, which surrounds an oval central field 17, the track being delineated by an outer rail 13 and an inner rail 15. Said track 11 is provided with a grandstand 19 having a general seating section 21 and a roof seating section 23. Immediately beyond the finish line 22 is a judges' stand 24. The track 11 may also be provided with several chutes 25, 25', and one or more starting gates 26. There should also be suitable markers 28, such as numbers or letters visible from above (Figs. 7 and 8), secured to the inner rail 15, or other convenient supports, so that they will be visible in the finished pictures.

The race track 11 is further provided with an aerial cableway 27, made up of a pair of parallel flexible wire cables 29 which are sustained substantially horizontally in the air by a plurality of towers 31. Although any suitable type of tower may be used, no specific tower structure being necessary to the present invention, we prefer to use towers made up of relatively narrow elements which will not interfere with visibility. The towers 31 are preferably positioned in the central field 17 but as close as possible to the inner rail 15. In the illustrated embodiment the successive towers 31 are one-sixteenth of a mile apart, so that each tower is located over one of the furlong posts 32.

Suitably supported at the upper extremity of each tower 31 is a rigid, horizontally disposed I beam 33, each of said beams being positioned approximately perpendicularly to the adjacent portion of the race track 11. The cables 29 are strung over the beams 33 of the several towers 31, with as little sag as possible between the towers, so as to form the two wire aerial cableway 27, which is high in the air and substantially follows the oval contour of the race track 11. Said cables are maintained in their parallel, equally spaced relationship by a plurality of horizontally positioned cable ties 35 which are positioned generally normal to the said cables.

Although the cable ties 35 may be made up in any suitable manner, in order to achieve compressive stiffness and tensional strength with light weight, I prefer to make them up in the form of a skeletal triangular prism comprising three mutually parallel horizontally positioned tie rods 37 joined to each other by a suitable bracing of latticework 39. The ends of the three rods 37, at each extremity of each cable tie 35, pass through holes in a flat, vertically disposed end plate 41 and are secured thereto as by welding. The upper portions 38 of said plates 41 are bent outwardly at an angle, preferably an angle of about 45°. Secured to the opposite faces of each of said upper portions 38, by bolts 40, are a pair of cable clamps 42. Said clamps 42 are made up of relatively thin metal but are horizontally elongated and they are provided with opposing crescent shaped jaws 43 between which the cables 29 are clamped. The jaws 43 are preferably finely tapered and extend around the cables 29 only slightly in excess of 180°, so as not to interfere with the operation of the wheels of the cable car as will become clear hereinafter.

Secured to the inner face of each end plate 41, as by bolts 44, is a brace clamp 45, which is a flat plate provided at its upper edge with a jaw 46, which is crescent shaped in vertical transverse cross-section, and also arcuate in horizontal cross-section.

Horizontally disposed diagonal braces 47 may be secured between said brace clamps 45 and the end plates 41. Said braces 47 may be made in any suitable manner but they are preferably merely wire rope for lightness and strength and they criss-cross between the cables 29 and the successive cable ties 35.

Throughout the straight portions of the cableway 27, as where it follows along the home stretch and far stretch of the track 11, the construction of the cableway is, as already described and illustrated in Figure 3, relatively simple in structure.

However, where said cableway 27 must follow the curves at the ends of the race track 11, a rather unusual type of construction is provided, as best illustrated in Figures 4 and 5.

As there shown, the cables 29 are maintained, between consecutive towers 31, in a generally curved configuration by a construction which somewhat resembled a conventional hanging hammock which is wide in the center and narrow at the ends where it is sustained. Thus the cableway 27, made up of the two cables 29 and the cable ties 35, diagonal braces 47, etc., is maintained in arcuate configuration by means of a chord 49, which may be a wire rope stretched under considerable tension between the said consecutive towers 31, and a plurality of horizontal, radially disposed struts 51.

The struts 51 are stiff members of any suitable construction, and are preferably merely extensions of some or all of the cable ties 35, in said hammock-like sector of the cableway 27, and they are secured to the chord 49 at their inner extremities so as to keep the cables 29 spaced from said chord as shown. The chord 49 is further maintained by a catenary 53, which is preferably made up of wire rope anchored at its opposite ends to or near the bases of the consecutive towers 31 aforesaid and secured in a taut upward curve by a plurality of vertically disposed tie wires 55, extending from the catenary to the chord.

As shown in the drawing particularly in Figures 6, 7 and 8, a cable car 57 is positioned upon the two cables 29. Said cable car 57 may be constructed in any suitable manner. The particular car 57 illustrated is preferably fabricated of light weight materials in accordance generally with conventional aircraft practice. It includes a single, horizontally disposed, transverse wing 59, having at its center an elongated longitudinally positioned motor nacelle 61 and at its right and left extremities respectively a cameraman's cab 63 and a control cab 65.

The car 57 is sustained upon eight wheels 67, 69 which are connected to the motor nacelle 61 by means of four legs 71. Each leg 71 carries one regular wheel 67 on a horizontal shaft 68, and one safety wheel 69 which is obliquely disposed, being on a shaft 70 angulated at about 45° from the horizontal. All of the wheels 67, 69 are provided with suitable deeply channelled rims 72, preferably rubber covered, which are of suitable concave configuration to engage the cables 29 and roll freely over both the said cables and the jaws 43 of the cable clamps 42.

As is clearly shown in Figure 9, the cables 29 are so interlocked within the channelled rims 72 of said wheels 67, 69 that the cable car 57, although perfectly free to ride along the cables 29, is so restricted against upward movement that it cannot leave said cables even though it may travel at relatively high speeds, may go around turns and may be buffeted by high winds.

To insure the greatest stability, the center of gravity of the cable car 57 should be kept as low as possible. The motor nacelle 61 and the cabs 63, 65 are preferably streamlined although, in the embodiment illustrated, the expected maximum speeds (less than fifty miles per hour) do not require extreme streamlining.

The motor nacelle 61 houses any suitable propulsion means (not shown). An electric motor or automotive power plant (as gasoline or diesel) may be used as desired. Either is relatively quiet and dependable. With such an installation one or more of the wheels 67, 69 would be suitably geared (gearing not shown) to the motor for rotation thereby and the other wheels would be freely rotatable upon their axes.

On the other hand, a jet type engine or aircraft engine may be used. A jet motor, assuming experience proves it to be quiet enough so as not to disturb the horses or the spectators, would be preferred, because of low weight to power ratio, rapid acceleration, smooth speed control, substantial absence of vibration (which is important to photography), the absence of any external impediment, such as a propeller (thus allowing lower placement of the motor nacelle 61), etc. However, a conventional aircraft engine and airscrew may be used. Whichever type of propulsion means is used, it should be able to propel the car 57 backward as well as forward.

The cameraman's cab 63 and control cab 65, respectively, need only be of sizes to accommodate a cameraman with his equipment and a car operator, both of whom will be seated. It will be understood that if the car 57 is in front of the horses 73 (as shown in Figures 1, 7 and 8) the cameraman and car operator will face in a backward direction during the running of a race, but, if the car is behind the horses, both of said persons will face forward. Thus, in the illustrated embodiment, both the cameraman's cab 63 and control cab 65 (Figures 7 and 8) are provided with transparent, substantially semispherical "blisters" 75 facing both forward and aft.

If desired, the cameraman may also act as car operator, in which event a suitable counterweight (not shown) may be substituted for the control cab 65 and car operator.

Some means for allowing the cameraman and car operator to enter and leave the cable car 57 must of course be provided. A suggested means is a stairway 77 or ladder which is positioned beneath the aerial cableway 27 a short distance beyond the finish line 22 and judges stand 24.

A processing laboratory and motion picture projection room 79 are preferably positioned near the foot of said stairway 77, or at any other convenient place, so that finished pictures of the race may be viewed by the judges or other interested persons immediately after each race.

In the operation and use of the system and apparatus just described, the several towers 31 and the aerial cableway 27 are erected at a race track 11, as either a permanent or temporary installation. As the cableway 27 is made up primarily of flexible wire cables and struts, and as the towers should preferably be of the portable type (such as illustrated in the drawing herein), the entire installation may be moved from race track to race track, as most tracks operate only a few weeks or months each year. The installation will also include one or more cable cars 57 positioned upon the cables 29, as already described. If several cars 57 are to be used, each may be independently operated or preferably the first car may tow the others. The car operator and cameraman, with his photographic equipment, will be in their proper cabs 65, 63.

Before a particular race, the cable car 57 is moved along the cables 29 to its position for the start of the race. If it has been determined that pictures are to be taken from ahead of the horses, a car will be positioned a predetermined distance ahead of the starting gate 26. If however, the pictures are to be taken from behind the horses 73, the car 57 will be positioned a like distance behind the gate 26.

If the race is to start in a chute 25 or 25' of relatively short length, the cable car 57 may be at a suitable position on the cableway 27 at the mouth of said chute. However, at those race courses which have an unduly long chute, it may be necessary to provide a spur (not shown) extending from the cableway 27 over said chute.

In such a situation the cable car 27 will be backed down the spur a sufficient distance so that the horses 73 may be photographed as they leave the starting gate 26. In backing the car the reversing means, already referred to, will be used.

As the race begins and the horses 73 start, the car operator, stationed in the control cab 65, will cause the car to be moved forward by the propulsion means. Preferably, for best photograph results, he will maintain, throughout the race, a constant distance between the horses and the car.

As the horses move around the track 11, the car will continue to move along the cables 29 over them. Throughout the entire race the cameraman, in his cab 63, will operate his cameras, television equipment, etc., so as to record images of the entire race from start to finish.

It should be noted that, although the towers are erected to one side of the race track 11, part of the cableway 27 may extend partly over the inner rail 15 and over the race track itself, and the cameraman's cab 63 will extend as far over the race track as desired (the car 57 being designed with a suitable span of the wing 59 for this purpose). Thus, it will be seen that the cameraman, throughout the entire race, will be positioned directly in front of the horses 73 by a predetermined distance, and also above said horses by a predetermined distance (dependent only upon the height of the towers). It is true that, in going around the turns at the ends of the track 11, the cameraman may be very slightly displaced from his position directly in front of the horses. In view of the fact, however, that the average race track is designed with turns having diameters of the order of 800 feet, and as the cameraman will only precede the horses by a distance of the order of perhaps 50 feet, it will be evident that the displacement will be insignificant.

However, even this minor displacement may also be entirely corrected by a simple expedient. This is accomplished by making the wing span of the car slightly greater and setting those towers 31 which are positioned along the straight portions of the track a short distance back from the inner rail 15. The towers 31 situated about the turns are, however, left right up against the said inner rail 15, as shown in the drawing. In this way the cameraman's cab 63 will be in the same relative position over the horses 73 as described above, because the setting back of the towers 31 along the straightaways will be compensated for by the longer wing span. However along the turns at the ends of the track, the longer wing span will position the cameraman's cab 63 a sufficient additional distance over the track so as to keep him directly in front of the horses even around the turns. This modified arrangement may be used, but it is believed that, for all practical purposes, the very slight displacement on the turns, occurring with the apparatus as illustrated in the drawing, will not adversely affect the finished pictures.

The combination of the regular wheels 67 and the safety wheels 69 is such that it will be perfectly safe to operate the car 57 at high speeds and around turns with complete safety. The cables 29 will be stretched very taut throughout the entire length of the cableway 27 and further they will be maintained equi-distant at all points by the combination of the cable ties 35 and the diagonal braces 47. Further, as the car 57 travels along the cables 29, the said cables will be maintained equi-distantly due to the fact that the regular wheels 67 have deeply channeled, rubber covered, rims 72 which extend well down on both sides of each cable 29. As each outwardly tilted safety wheel 69 is positioned immediately in front of, or behind, one of the regular wheels 67 (see Figures 9 and 10), it will be impossible for the cables 29 to move toward each other sufficiently to slip out of the angulated channelled rims 72 of said safety wheels. It will be seen that the outer flanges of the rims 72 of the safety wheels 69 will, in effect, hook below the cables 29 so as to maintain the car 57 upon said cables despite laterally or upwardly directed forces which may act upon the car 57 resulting from turns, winds, etc.

The curved portions of the cableway 27, as already pointed out, are made up of one or more hammock-like sectors (Figure 4). The cables 29 throughout each of such hammock-like sectors are maintained arcuately by the taut chord 49 and the struts 51 which keep the cables and the chord spaced from each other to one of these hammock-like sectors, the weight of the car will exert a downward force upon the cables 29, thereby setting up a twisting moment which would tend to twist the central portion of such sector, by forcing the cables 29 downwardly and the chord 49 upwardly intermediate the extremities of such sector. Actually, the cables 29 are hung with such tautness that any twisting of the hammock-like sector would not be significant. However to counteract and minimize the effect of such twisting tendency, the chord 49 is restrained against upward displacement by the catenary 53, the ends of which are anchored near the bases of the towers 31 and the tie wires 55 which tie the said chord to the said catenary.

An additional safety feature may be incorporated, if desired, and that is the banking of the cableway on the curved portions thereof. This is accomplished by merely angulating the I beams 33 slightly so as to maintain the outermost cable a little higher than the inner cable.

Although the apparatus described might seem at first blush to be such as to interfere with spectators' visibility or to mar the attractiveness of a race track, its actual effect will not be that at all. For instance, the cables 29 need only be of the order of three-quarters of an inch in diameter so that they will be almost invisible from the grandstand. Every other element of the structure will similarly be of small diameter, even including the parts of the towers. Thus it will be seen that the entire apparatus will be less of an interference to spectators' visibility than there would be if a number of conventional telegraph poles and electric wires were strung across the central field 17, as such poles would be large in diameter relative to the components of the present device.

In order to further prevent even the slightest suspicion of interference with visibility, the towers 31 should preferably be of a suitable height so that the cables 29 (as shown in Figure 2) will be maintained at such a level that it is above the lines of vision of spectators in the general seating section 21 of the grandstand 19 and below the lines of vision of spectators in the roof seating section 23 of the grandstand.

When a race is finished, the car 57 will be stopped close to the stairway 77 which preferably is near the finish line 22, so that no time will be lost in getting the car to that point. The film (preferably in conventional magazine form) will then be taken immediately to the processing laboratory 79. This may be accomplished by sliding the film down an inclined wire (not shown) stretched from the top of the stairway 77 directly to the processing laboratory 79. Once at the processing laboratory, the film will be passed through a high speed processing device (not shown) so that it may be projected in the course of a very few minutes. Such processing devices are already known in the art and are not specifically a part of the present invention and hence need not be described in greater detail in the present application.

It should also be pointed out that, if desired, the processing apparatus may be carried in the cameraman's cab 63, as it may be of the type which is integral with a camera so that, as the film is exposed, it passes almost simultaneously through the said processing apparatus. If this form of device is used a reel of completely processed and dried film, ready for projection, may be dropped to the projection room 79 almost immediately after the end of the race.

In view of the fact that the numbers or letters of the markers 28 will be visible in the finished pictures, it will be a simple matter to locate that portion of the film which covers the sector of the track where it is charged the foul was perpetrated.

The system just described will, therefore, provide photographs of an entire race almost immediately after its finish, but more important the said pictures will clearly show the horses and jockeys and the spaces between them so that, if fouls take place, they will be clearly seen. Also important is the fact that, upon the installation of such a device at a race track, the jockeys will quickly realize that all of their actions will be clearly recorded and they will be deterred from attempting to commit fouls. Thus prevention will be substituted for cure. If however a foul is charged, the charge may be substantiated or disproved immediately by the pictures taken. Also of tremendous consequence to the sport of racing, and particularly to the race track operators, will be the fact that public confidence in racing will be greatly improved.

In the event of fog or the like satisfactory pictures may nevertheless be secured by the use of infra-red film, as is well known in the art.

If desired, the towers and cableway may also be utilized as supports for apparatus for illuminating the race course, thus saving the necessity of constructing separate supports therefor.

What I claim is:

1. An apparatus for taking motion pictures of a horse race along a race track having at least one curved portion, comprising a plurality of spaced towers positioned alongside said race track, an aerial cableway including a cable tautly sustained by said towers and substantially following the contour of the said race track, and a hammock-like sector adjacent said curved portion sustained between two successive towers including a chord stretched tautly between said two towers, a portion of the cable aforesaid disposed substantially in an arc between said two towers, and a plurality of struts intermediate said chord and said cable to maintain the cable in said arcuate configuration, and a car supported by and movable along said cable, said car including a cameraman's cab positioned laterally of the cable so as to be substantially above the race track and adapted to accommodate a cameraman and motion picture equipment, so that the car can be supported by and moved along the cable as the horses run along the rack track and so that motion pictures may be taken of the horses in a generally downward direction.

2. An apparatus for taking motion pictures of a horse race along a race track having at least one curved portion comprising a plurality of spaced towers positioned alongside said race track, an aerial cableway including two substantially parallel cables tautly sustained by said towers and substantially following the contour of said race track, and a hammock-like sector adjacent said curved portion sustained between two successive towers including a chord stretched tautly between said two towers, portions of the cables aforesaid disposed substantially in arcs between said two towers, and a plurality of struts intermediate said chord and said cables to maintain the cables in said arcuate configuration, and a car supported by and movable along said cables, said car including a cameraman's cab positioned laterally of the cables so as to be substantially above the race track and accommodating a cameraman and motion picture equipment, so that the car can be supported by and moved along the cables as the horses run along the race track and so that motion pictures may be taken of the horses in a generally downward direction.

3. An apparatus for taking motion pictures of a horse race along a race track having at least one curved portion comprising a single line of spaced towers positioned alongside said race track and at locations disposed without the confines of the latter, an aerial cableway including two mutually spaced cables, a cable car supported by said cables above and projecting from without the confines of said track therewithin to facilitate taking of said motion pictures, said cables being tautly sustained by said towers and substantially following the contour of said race track, a hammock-like sector provided at said curved portion of the track and sustained by two towers of said line of towers, said sector including a chord tautly stretched between said two towers, portions of said cables disposed substantially in an arc between said two towers, and a plurality of struts extending between said chord and said cables, for maintaining said cables in said substantially arcuate configuration, an image recording device sustained by said car above said track, whereby said car may be moved and supported along said cableway as the horses run along the race track to afford taking of motion pictures of the latter from within the confines of and above said track.

4. An apparatus according to claim 3, wherein, intermediate successive towers, cable ties are provided between said cables of said aerial cableway to thereby span the said cables and to maintain same in substantially parallel relation to each other.

5. An apparatus according to claim 3, which includes a catenary, the ends of which are anchored respectively proximate to the bases of said two towers, and a plurality of tie members connecting said chord to said catenary to limit upward movement of said chord.

6. An apparatus as defined in claim 1, wherein at least one tower adjacent said curved portion of the track is positioned closer to the track than at least one other tower not adjacent said curved portion, so that the said cameraman's cab may be maintained in substantially the same position relative to the horses throughout a race.

7. An apparatus as defined in claim 2, wherein at least one tower adjacent said curved portion of the track is positioned closer to the track than at least one other tower not adjacent said curved portion, so that the said cameraman's cab may be maintained in substantially the same position relative to the horses throughout a race.

8. Apparatus for recording images of a subject moving along a predetermined curved path, comprising an aerial railway, said railway including a plurality of spaced towers positioned alongside said path and two substantially parallel flexible cables sustained by said towers at a higher level than, and to one side of, said path and substantially following the contour of said path and at least one hammock-like sector intermediate two successive towers, which sector includes a taut chord connecting said two successive towers and a plurality of struts extending between said chord and the portions of said two cables intermediate said two towers and maintaining said portions in substantially parallel arcs relative to said chord, a car sustained by said cables and movable therealong, said car including a portion extending laterally beyond said railway and substantially overhanging said path, an image recording device sustained by said overhanging portion and movable above said path upon movement of said car to allow continuous photography, in a generally downward direction, of a subject moving along said path.

9. Apparatus for recording images of a subject moving along a predetermined curved path, comprising an aerial railway, said railway including a plurality of spaced towers positioned alongside said path and two substantially parallel flexible cables sustained by said towers at a higher level than, and to one side of, said path and substantially following the contour of said path and at least one hammock-like sector intermediate two successive towers, which sector includes a taut chord connecting said two successive towers, and a plurality of struts extending between said chord and the portions of said two cables intermediate said two towers and maintaining said portions in substantially parallel arcs relative to said chord, and a catenary having its ends respectively secured proximate to the bases of said two successive towers and its midportion extending upwardly toward said chord, and a plurality of tie members connecting a plurality of points along said chord to a plurality of points along said catenary to restrain upward movement of said chord, a car sustained by said cables and movable therealong, said car including a portion extending laterally beyond said railway and substantially overhanging said path, and an image recording device sustained by said overhanging portion and movable above said path upon movement of said car to allow continuous photography, in a generally downward direction, of a subject moving along said path.

ERIC A. BLACK.

REFERENCES CITED

The following references are of record in the file of this patent:

UNITED STATES PATENTS

| Number | Name | Date |
|---|---|---|
| 331,388 | Enos | Dec. 1, 1885 |
| 579,147 | Harman | Mar. 23, 1897 |
| 836,260 | Hyde | Nov. 20, 1906 |
| 1,113,451 | Levasseur et al. | Oct. 13, 1914 |
| 1,149,764 | Hinsen | Aug. 10, 1915 |
| 1,714,183 | McPhee | May 21, 1929 |
| 2,040,610 | Huddleston | May 12, 1936 |
| 2,077,104 | Seib | Apr. 13, 1937 |
| 2,348,841 | Oswald | May 16, 1944 |
| 2,408,528 | Nassour | Oct. 1, 1946 |